United States Patent
Min et al.

(10) Patent No.: US 8,154,547 B2
(45) Date of Patent: Apr. 10, 2012

(54) METHOD AND SYSTEM FOR EARLY Z TEST IN TITLE-BASED THREE-DIMENSIONAL RENDERING

(75) Inventors: Kyoung June Min, Yongin-si (KR); Jong Myon Kim, Yongin-si (KR); Hee Seok Kim, Yongin-si (KR); Jeong Wook Kim, Yongin-si (KR); Suk Jin Kim, Yongin-si (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 0 days.

(21) Appl. No.: 13/090,924

(22) Filed: Apr. 20, 2011

(65) Prior Publication Data

US 2011/0193862 A1 Aug. 11, 2011

Related U.S. Application Data

(63) Continuation of application No. 11/655,244, filed on Jan. 19, 2007, now abandoned.

(30) Foreign Application Priority Data

Sep. 18, 2006 (KR) .................. 10-2006-0090058

(51) Int. Cl.
*G06T 15/40* (2011.01)
(52) U.S. Cl. ...................... 345/422; 345/421
(58) Field of Classification Search .................. 345/421, 345/422
See application file for complete search history.

(56) References Cited

U.S. PATENT DOCUMENTS

| 6,246,415 | B1 | 6/2001 | Grossman et al. |
| 6,437,780 | B1 | 8/2002 | Baltaretu et al. |
| 6,636,212 | B1 | 10/2003 | Zhu |
| 2001/0040583 | A1 | 11/2001 | Yue et al. |
| 2003/0043148 | A1 | 3/2003 | Mei et al. |

FOREIGN PATENT DOCUMENTS

| EP | 1107177 A2 | 6/2001 |
| GB | 2301513 A | 12/1996 |
| JP | 2004-537129 A | 9/2004 |
| KR | 10-2001-0073076 A | 7/2001 |
| KR | 10-2003-0005251 A | 1/2003 |

OTHER PUBLICATIONS

Japanese Office Action issued on Mar. 9, 2010 in the correponding Japanese Patent Application No. 2007-093766.
"Burst Mode Access and Timing." Welcome to the PC Guide! Apr. 17, 2001. Web. Nov. 23, 2009. <http://www.pcguide.com/ref/ram/timingBurst-c.html>.

*Primary Examiner* — Xiao M. Wu
*Assistant Examiner* — Scott E Sonners
(74) *Attorney, Agent, or Firm* — Sughrue Mion, PLLC (57) ABSTRACT

A method and system for an early Z test in a tile-based three-dimensional rendering is provided. In the method and system for an early Z test, a portion which is not displayed to a user is removed prior to performing a rasterization process, and thereby performing the 3D rendering efficiently. The method includes segmenting a scene into tiles for performing a rendering with respect to a triangle; selecting a first tile of the tiles, which has a tile Z value less than a minimum Z value of the triangle; and performing the rendering with respect to the triangle in remaining tiles excluding the selected first tile of the tiles.

11 Claims, 7 Drawing Sheets

METHOD AND SYSTEM FOR EARLY Z TEST IN TITLE-BASED THREE-DIMENSIONAL RENDERING

CROSS-REFERENCE TO RELATED APPLICATION

This is a Continuation of application Ser. No. 11/655,244, filed Jan. 19, 2007, which claims priority from Korean Patent Application No. 10-2006-0090058, filed on Sep. 18, 2006, in the Korean Intellectual Property Office, the entire disclosure of which is incorporated herein by reference.

BACKGROUND OF THE INVENTION

1. Field of the Invention

Methods and systems consistent with the present invention relate to an early Z test in a tile-based three-dimensional rendering, and more particularly, to an early Z test which may perform a rendering with respect to a triangle excluding a unseen portion which is being overlapped by another triangle.

2. Description of Related Art

Currently, as performance of personal terminals develop, providing information using three-dimensional (3D) graphics increases. Although 3D graphics were only used in computer terminals in the past, 3D graphics are currently used in a portable terminal such as a cell phone, a personal digital assistant (PDA), or a navigation system. A 3D model may be more realistically depicted in a display device which is two-dimensionally displayed, when using 3D graphics.

However, even when depicting the 3D model in 3D graphics, a user sees the 3D model via a 2D scene. Accordingly, a process of converting the 3D model which is viewed in the user's point of view is required so as to display the 3D model in the 2D scene to the user. In the process of the converting, rasterization, a process of generating the 2D scene, is performed. In the rasterization, the 3D model is converted from a vector format into a 2D coordinate, and rendered as a pixel-based 2D model. Also, an operation of generating the 2D scene is performed based on a triangle which is a basic unit of the 3D model.

According to a conventional art, each of the triangles to be processed in the rasterization is processed with respect to the entire scene. In this instance, a frame buffer, i.e., color buffer+Z-buffer, which has the same size as a screen resolution, is required. Also, the frame buffer may not be simply embedded in a chip due to its size. Accordingly, the frame buffer is randomly accessed via an external memory. Performing external memory access consumes about ten times as much power as performing memory access from memory embedded in a chip, and therefore the external memory access is required to be less frequently used in a mobile environment for low power consumption. Thus, a tile-based 3D rendering method is developed to overcome disadvantages described above.

The tile-based 3D rendering method segments a scene into a plurality of tiles, and performs a rendering with respect to only a triangle in a tile included in the triangle. In this instance, a rendering with respect to a single tile is performed by using a frame memory. The frame memory is embedded in a chip and has a resolution size of the single tile. After completing the rendering with respect to the tile, the rendered tile is transferred to an external frame buffer by using a burst mode. According to the tile-based 3D rendering method, frequent external frame buffer memory access may be eliminated, and an effective external burst memory access for each tile is performed only once. Accordingly, the tile-based 3D rendering method is effective in terms of low power consumption.

Also, after rasterization is completed, when a plurality of models are overlapped on the same position of a two-dimensionally converted coordinate, a model which is the closest to a user covers all remaining models located in the same position. Accordingly, only the model which is the closest to the user is required to be displayed on a screen. A Z test enables unseen models covered with other models to not be displayed on the screen.

Figure 1:
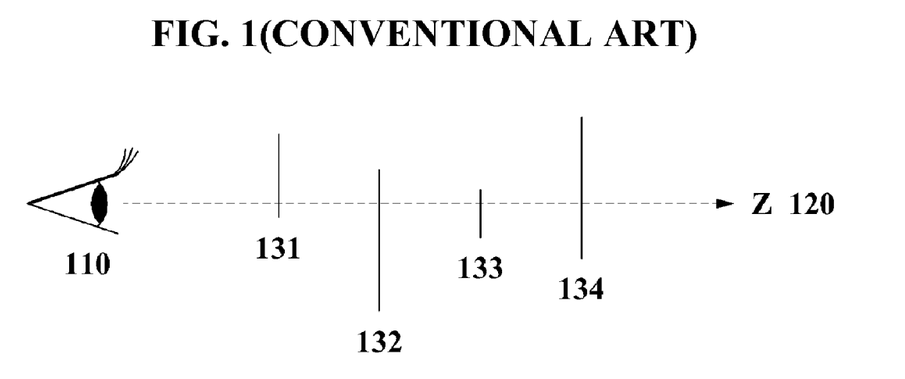
FIG. 1 is a diagram illustrating a method of performing a Z test in a 3D rendering according to a conventional art.

FIG. 1 is a diagram illustrating a method of performing a Z test in a 3D rendering according to a conventional art.

As illustrated in FIG. 1, a scene which a user 110 looks at comprises four models 131, 132, 133, and 134. The user 110 may completely see the model 131, since the model 131 is a closest to the user. The user 110 may see only a lower portion of the model 132, since an upper portion of the model 132 is covered with the model 131. The model 133 is not seen, since the model 133 is completely covered with the models 131 and the 132. The user 110 may see only an upper portion of the model 134. As described above, a 3D depth of each of the models designates a Z value in order to ascertain a portion where the user 110 may actually see. When three-dimensionally displayed, the Z value indicates a value of a z-axis direction. The z-axis is at a right angle to an x-axis and a y-axis. As illustrated in a Z-axis 120 of FIG. 1, the further from the user 110 the models are on the z-axis 120, the greater the Z value is. Accordingly, the Z value gradually becomes greater from the model 131 to the model 134.

As described above, the Z test is required to be performed with the Z value of each pixel, after converting a 3D vector model into a pixel-based 2D model, i.e., completing a rasterization, since a general Z test is based on a 2D scene. When the Z test is performed after completing the rasterization, the rasterization with respect to unseen models covered with another model is also performed. Accordingly, unnecessary operation is performed.

Accordingly, in a tile-based 3D rendering, when performing a rendering for a triangle is eliminated since a corresponding tile is determined to not be displayed on a screen, the rendering for the entire scene may be more efficiently performed. Thus, an early Z test, which may eliminate the rendering with respect to the triangle in the tile which is determined to not be displayed on the screen, is desired.

SUMMARY OF THE INVENTION

The present invention provides a method and system for an early Z test which may eliminate performing of a rendering with respect to a triangle which is not displayed on a screen.

The present invention also provides a method and system for an early Z test which may be performed with a simple operation by using information which is additionally generated in a tile binning process of a 3D rendering.

The present invention also provides a method and system for an early Z test which may be performed with a relatively small Z-buffer by performing the Z test per tile, as opposed to per pixel.

According to an aspect of the present invention, there is provided an early Z test method, the method including: segmenting a scene for performing a rendering with respect to a triangle into a plurality of tiles; selecting a tile which has a tile Z value less than a minimum Z value of the triangle from the plurality of tiles; and performing the rendering with respect to the triangle in remaining tiles excluding the selected tile of the plurality of tiles.

According to another aspect of the present invention, there is provided an early Z test system, the system including: a tile segmentation unit which segments a scene for performing a rendering with respect to a triangle into a plurality of tiles; a tile selection unit which selects a tile which has a tile Z value less than a minimum Z value of the triangle from the plurality of tiles; and a rendering unit performing the rendering with respect to the triangle in remaining tiles excluding the selected tile of the plurality of tiles.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
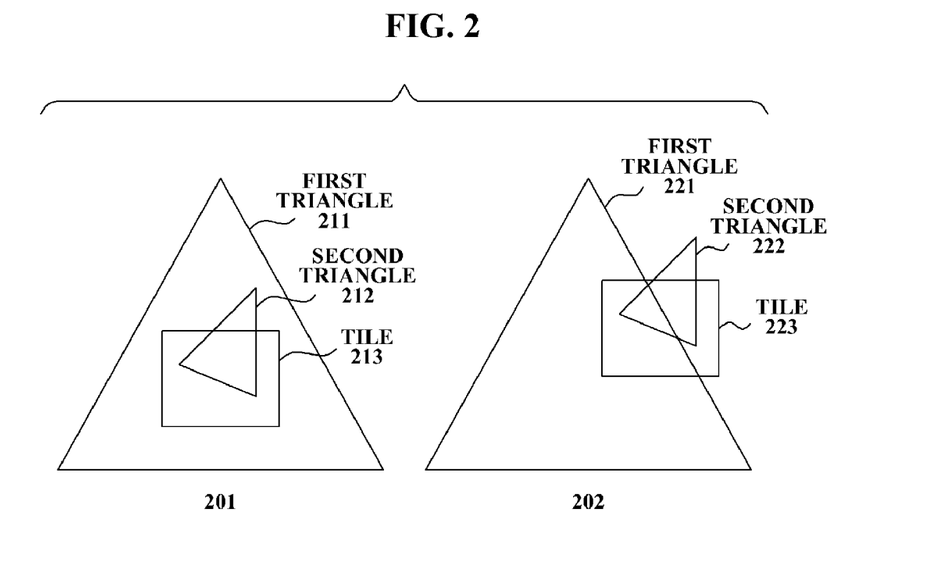
FIG. 2 is a diagram illustrating an example of performing a rendering with respect to a triangle, in a tile-based 3D rendering method according to an exemplary embodiment of the present invention.

FIG. 2 is a diagram illustrating an example of performing a rendering with respect to a triangle, in a tile-based 3D rendering method according to an exemplary embodiment of the present invention.

According to an exemplary embodiment of the present invention, an early Z test method may perform the rendering with respect to the triangle excluding a second triangle 212 which is covered with a first triangle 211. For this, as illustrated in an example 201 of FIG. 2, when a tile 213 partially including the second triangle 212 is completely included in the first triangle 211, and the second triangle 212 is located behind the first triangle 211, an early Z test method is not required to perform the rendering with respect to the second triangle 212 in the tile 213. When the tile 213 is completely included in the first triangle 211, a portion of the second triangle 212 included in the tile 213 is naturally included in the first triangle 211. Accordingly, when the early Z test method does not perform the rendering with respect to the second triangle 212 in the tile 213, the rendering may be performed excluding triangles which are not displayed on a screen. Accordingly, the rendering may be efficiently performed.

Conversely, as illustrated in an example 202 of FIG. 2, when a tile 223 is partially included in a first triangle 221, the tile 223 is not completely covered with the first triangle 221. Accordingly, it is not assured that a portion of a second triangle 222, which is partially included in the tile 223, is covered with the first triangle 221. As illustrated in the example 202 of FIG. 2, a portion of the second triangle 222 is covered with the first triangle 221. At the same time, another portion of the second triangle 222, which is not covered with the first triangle 221 in the tile 223 also exists. Accordingly, only when the tile is completely included in the triangle, the rendering may be performed excluding triangles which are not displayed on the screen.

Figure 3:
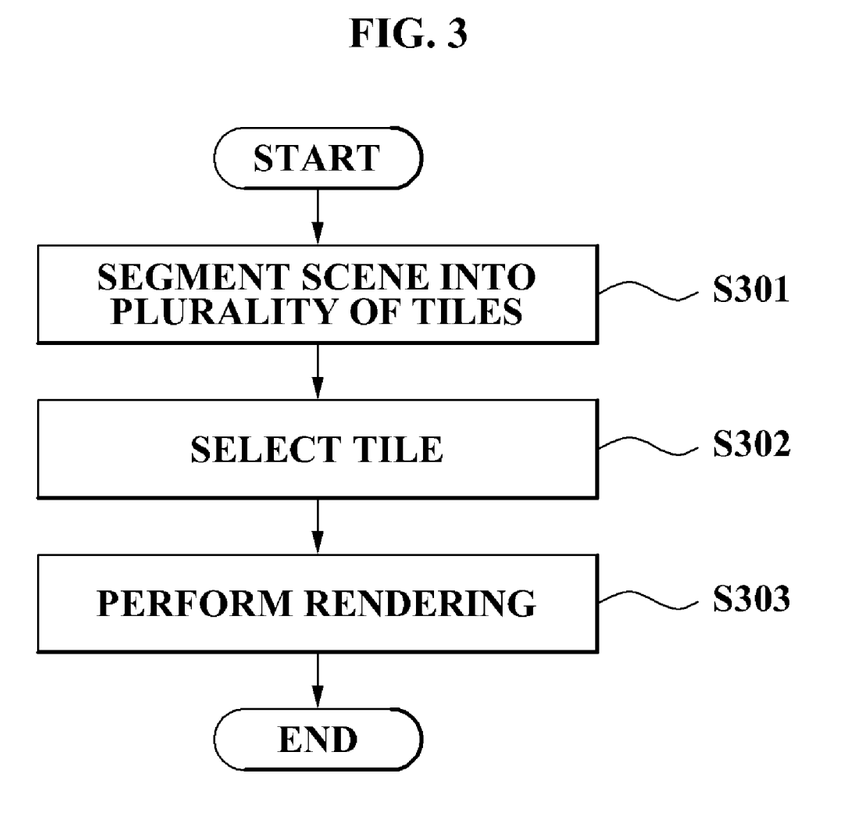
FIG. 3 is a flowchart illustrating an early Z test method according to an exemplary embodiment of the present invention.

FIG. 3 is a flowchart illustrating an early Z test method according to an exemplary embodiment of the present invention.

In operation S301, a scene for performing a rendering with respect to a triangle segmented into a plurality of tiles. Each of the tiles is a screen resolution which is divided into a predetermined size, and the screen resolution is displayed to a user. The rendering with respect to each of the tiles is performed, and thereby may perform the rendering with respect to an entire scene. As an example, when a scene with a resolution of 640*480 is segmented into a plurality of tiles with a resolution of 32*32, a number of tiles for rendering corresponds to 20*15. As described above, when the entire scene is segmented into the plurality of tiles, the rendering with respect to the entire scene may be performed by performing the rendering with respect to each of the tiles with a low resolution.

Particularly, when an object of the rendering is small, the rendering with respect to only tiles including the object is enough since the object is included in a portion of the entire scene. Accordingly, operation cost may be reduced compared to performing the rendering with respect to the entire scene. Also, in the present invention, a Z test is performed based on a tile, as opposed to a pixel, by segmenting into the tiles. Accordingly, a Z-buffer may be remarkably reduced, and an operation may be simplified.

In operation S302, a tile which has a tile Z value less than a minimum Z value of the triangle is selected from the plurality of tiles. The minimum Z value is a smallest Z value among Z values of three vertices of the triangle. The three vertices of the triangle exist in a 3D space comprising an x-axis, y-axis, and z-axis. In this instance, the z-axis is identical to an axis of user's line of sight, and a Z value on the z-axis designates a distance from the user's viewpoint. Accordingly, a point having a great Z value is relatively far from the user's viewpoint, and a point having a small Z value is relatively near the user's sight. Specifically, the point having the small Z value, from points having an identical x coordinate and y coordinate, may be displayed to the user, and remaining points are covered and unseen.

The triangle is on a plane, and each edge of the triangle is a straight line. Accordingly, a point having a Z value less than the smallest Z value, among the three vertices, may not exist on the triangle. Also, the smallest Z value of all points included in the triangle is the smallest Z value among Z values of the three vertices. Thus, the minimum Z value of the triangle is the smallest Z value of the three vertices.

Also, the tile Z value which is compared in operation S302 is a smallest value among maximum Z values of a triangle which completely include the tiles. The maximum Z value is a greatest value among the Z values of three vertices of the triangle. In this instance, a same principle as the minimum Z value is applied to the maximum Z value. When a tile is completely included in the triangle, the tile is completely covered with the triangle. Also, when the maximum Z value of the triangle has a value A, points having a Z value greater than the value A, in the tile, may not be displayed on the screen. Since the points having the Z value greater than the value A do not exist in the triangle, the points having the Z value greater than the value A, in the tile, are covered with the triangle, and are not displayed.

Accordingly, in operation S302, the tile Z value is required to be updated. In order to update the tile Z value, the tile is required to be completely included in the triangle. The tile which is not completely included in the triangle has a portion which is not covered with the triangle. Accordingly, another triangle may not be covered with the triangle. Thus, in order to update the tile Z value, the tile which is completely included in the triangle is required to be selected.

When selecting the tile which is completely included in the triangle, the tile Z value of the selected tile is compared with the maximum Z value of the triangle. In this instance, when the maximum Z value of the triangle is less than the tile Z value of the selected tile, the tile Z value of the selected tile is updated with the maximum Z value of the triangle. The tile Z value refers to when the triangle completely including the tile covers all points having a Z value greater than the tile Z value. Accordingly, when a triangle completely including the tile and having the maximum Z value less than an existing tile Z value exists, all the points having the Z value greater than the maximum Z value of the triangle are covered with the triangle. Thus, the tile Z value is required to be updated.

In operation S302, in order to update the tile Z value, the tile which is completely included in the triangle is required to be selected. For this, a half-plane edge function may be used. To select the tile which is completely included in the triangle by using the half-plane edge function, a discrimination value of a tile node of each of the tiles is required to be identified. The tile node may be a vertex of the tile, and the discrimination value confirms where the tile node is located based on the triangle. Accordingly, when the discrimination value is determined, information about where each of four vertices of the tile is located based on the triangle may be obtained, and thereby confirming whether each of the tiles is completely included in the triangle by using the information.

The discrimination value of the tile node includes a first discrimination value, a second discrimination value, and a third discrimination value. Also, the first discrimination value, the second discrimination value, and the third discrimination value may be determined based on a sign of a half-plane edge function value with respect to each of a first edge, a second edge, and a third edge of the triangle. As an example, when the half-plane edge function value is a positive number, the discrimination value may be determined as 1. Also, when the half-plane edge function value is 0 or a negative number, the discrimination value may be determined as 0. Another value may be set depending on the positive number, the negative number, and 0. When the sign of the half-plane edge function value with respect to each of the three edges of the triangle, in each of the tile nodes, may be ascertained, the discrimination value may be stored by any method.

The half-plane edge function to determine the discrimination value is a function indicating a relationship of a straight line and a point, and the half-plane edge function value is calculated by, $x=(x1-x0)$ $y=(y1-y0)$ $E(x,y)=(x-x0)*y-(y-y0)*x$ [Equation 1]

Here, both (x0, y0) and (x, y1) designates end points of the straight line, and (x, y) designates a coordinate of the point. Also, E(x, y) value is the half-plane edge function value. The half-plane edge function value is the negative number, when the point is in a left side of the straight line. Also, the half-plane edge function value is the positive number, when the point is in a right side of the straight line. The (x0, y0) and (x1, y1) refers to a direction of the straight line, and in an embodiment of the present invention, a direction of each edge of the triangle is determined clockwise along the triangle. Although the direction may be varied according to an embodiment, each of the edges is required to be determined based on a rotation direction so that the first discrimination value, the second discrimination value, and the third discrimination value have an identical value.

After identifying the discrimination values, whether the tile is completely included in the triangle may be confirmed. As an example, when the first discrimination value, the second discrimination value, and the third discrimination value of every tile node included in the tile are all positive numbers, all the tile nodes are included in the triangle. Also, it is determined that the tile is entirely included in the triangle, since the tile node corresponds to the four vertices of the tile. A method of confirming whether the tile is completely included in the triangle by using the half-plane edge function is described with reference to FIG. 6.

In operation S303, the rendering with respect to the triangle in remaining tiles excluding the selected tile of the plurality of tiles is performed. The selected tile is covered with the other triangle, and the triangle is not displayed. Accordingly, the selected tile is excluded when performing the rendering, and thus the rendering may be performed more efficiently. The tile where the triangle is not displayed may exist among an unselected tile. Accordingly, although the Z test is required to be performed in a final process of the rendering, as in the conventional art, a rendering operation may be remarkably reduced compared to the conventional art, since a portion which may be completely overlapped is removed.

Figure 4:
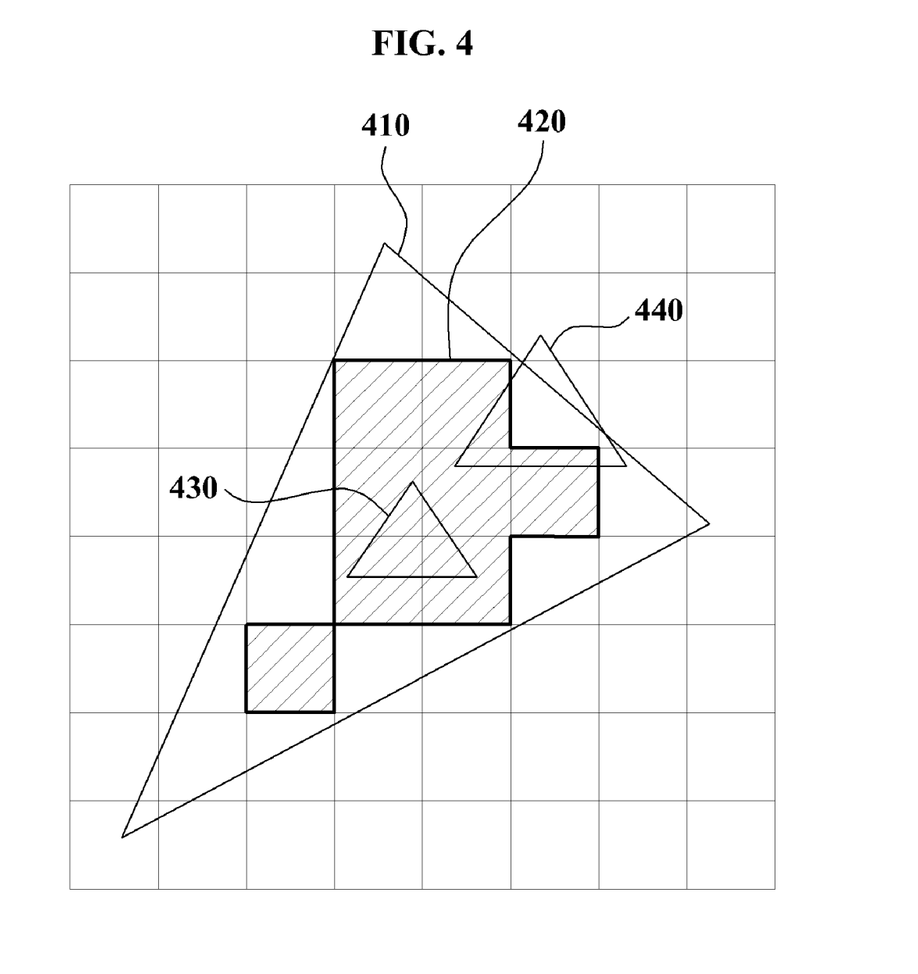
FIG. 4 is a diagram illustrating an example of performing an early Z test method according to an exemplary embodiment of the present invention.

FIG. 4 is a diagram illustrating an example of performing an early Z test method according to an exemplary embodiment of the present invention. In an exemplary embodiment of the present invention, a rendering is performed in an order of a triangle 410, a triangle 430, and a triangle 440.

When performing a rendering with respect to the triangle 410, a tile completely including the triangle 410 is selected, and a tile Z value of the selected tile and a minimum Z value of the triangle 410 are compared. In this instance, the triangle 410 is required to be rendered in all tiles, since a previously rendered triangle does not exist. For this, the tile Z value of each tile is required to be set as a greatest value which a Z value may initially have. Otherwise, a separate value which shows that the tile Z value has not been updated is stored to be distinguishable from a valid value. The tile completely including the triangle 410 corresponds to tiles 420, which is shaded. The tile Z value of each of the tiles 420 are updated. Accordingly, the tile Z value of each of the tiles 420 is updated with a maximum Z value of the triangle 410.

Also, when performing the rendering with respect to the triangle 430, the tile including the triangle 430 is selected, and a tile Z value of the tile and a minimum Z value of the triangle 430 are compared. In this instance, when the minimum Z value of the triangle 430 is greater than a maximum Z value of the triangle 410, the triangle 430 is covered with the triangle 410. In this instance, the tile Z value of each of the tiles is the same as the maximum Z value of the triangle 410, and thus the tile having the tile Z value less than the minimum Z value of the triangle 430 is excluded when performing the rendering with respect to the triangle 430.

Also, when performing the rendering with respect to the triangle 440, the tile including the triangle 440 is selected, and a tile Z value of the tiles and a minimum Z value of the triangle 440 are compared. In FIG. 4, although tile Z values of three tiles are updated, remaining tiles still have an initial tile Z value. Accordingly, the rendering with respect to the triangle 440 is required to be performed in the tiles which are not included in the tiles 420. As described above, according to the early Z test method of an exemplary embodiment of the present invention, the tiles which are covered with the other triangle are excluded, and thus the rendering operation may be performed more efficiently.

Figure 5:
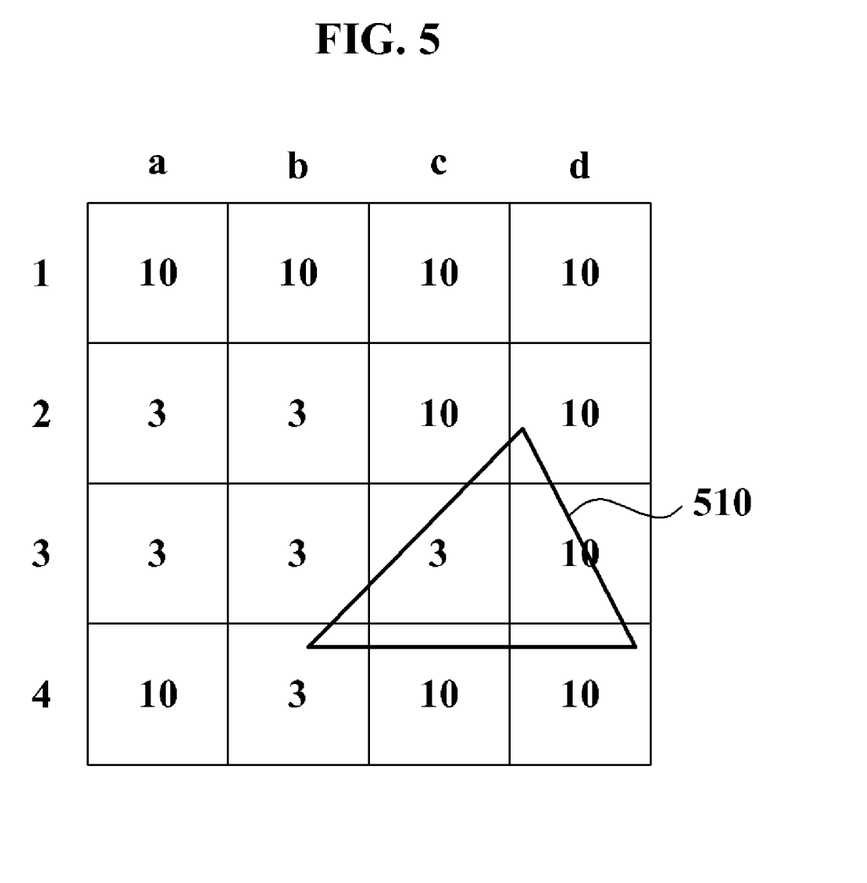
FIG. 5 is a diagram illustrating another example of performing an early Z test method according to an exemplary embodiment of the present invention.

FIG. 5 is a diagram illustrating another example of performing an early Z test method according to an exemplary embodiment of the present invention.

In FIG. 5, each number indicated on each tile refers to a tile Z value of each of the tiles.

When performing a rendering with respect to a triangle 510 having a minimum Z value of 5, a tile including the triangle 510, partially or entirely, is selected. Eight tiles, i.e., 2-c, 2-d, 3-b, 3-c, 3-d, 4-b, 4-c, and 4-d, are selected. After selecting the tile including the triangle 510, the tile Z value of each of the selected tiles and the minimum Z value of the triangle 510 are compared. Also, a tile having the tile Z value less than the minimum Z value of the triangle 510 is selected. Accordingly, the tiles 3-b, 3-c, and 4-b are selected. Since the tile Z value of the selected tiles is less than the minimum Z value of the triangle 510, the triangle 510 may not be displayed on a screen in the selected tiles. Accordingly, when the rendering with respect to the tiles 2-c, 2-d, 3-d, 4-c, and 4-d, excluding the selected tiles, are performed, the rendering may be performed more efficiently. In this instance, all portions including unselected tiles are not displayed on the screen, and thus a Z test based on a pixel is separately required when completing the rendering.

Figure 6:
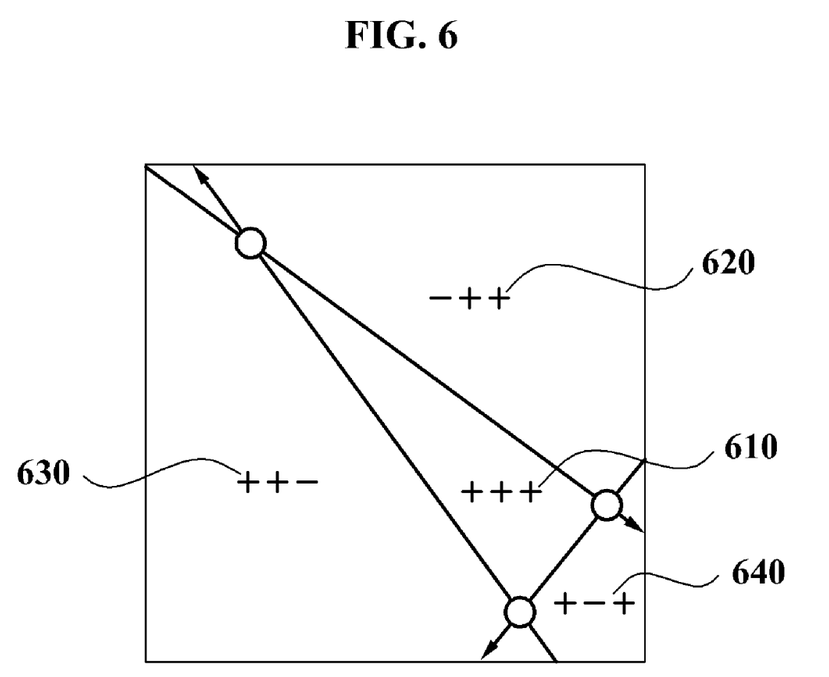
FIG. 6 is a diagram illustrating a method of selecting a tile which is completely included in a triangle by using a half-plane edge function, in an early Z test method according to an exemplary embodiment of the present invention.

FIG. 6 is a diagram illustrating a method of selecting a tile which is completely included in a triangle by using a half-plane edge function, in an early Z test method according to an exemplary embodiment of the present invention.

As illustrated in FIG. 6, when the half-plane edge function value with respect to each edge is calculated clockwise along three edges of the triangle, an inside 610 of the triangle has the half-plane edge function value a positive number with respect to all three edges, and an outside 620, 630 and 640 has the half-plane edge function value of negative value with respect to at least one edge. Accordingly, in the tile having the half-plane edge function value of the positive number with respect to four edges of the tile, the four edges of the tile are included in the triangle. Accordingly, the tile is entirely included in the triangle. Thus, it is simply confirmed whether the tile is completely included in the triangle by using the above-described method. Particularly, when using the half-plane edge function value of a tile node of each of the tiles, a tile binning may be performed. The tile binning determines whether the tile includes the triangle, partially or entirely, in all tiles. Accordingly, the tile binning and the early Z test may be simultaneously performed by calculating the half-plane edge function value once.

Figure 7:
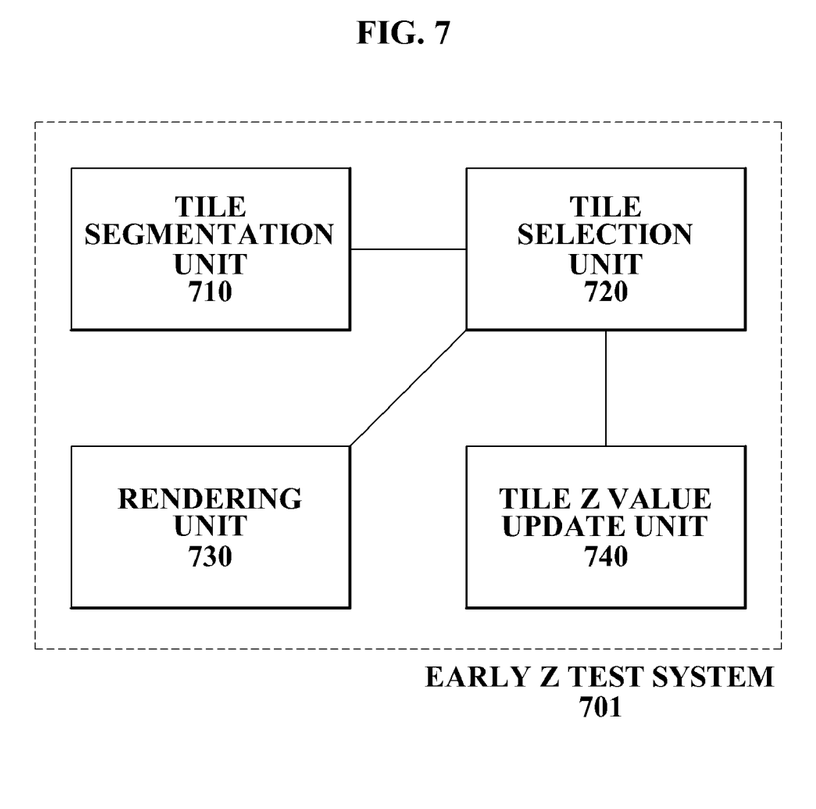
FIG. 7 is a diagram illustrating a configuration of an early Z test system according to an exemplary embodiment of the present invention.

FIG. 7 is a diagram illustrating a configuration of an early Z test system according to an exemplary embodiment of the present invention.

As illustrated in FIG. 7, the early Z test system 701 includes a tile segmentation unit 710, a tile selection unit 720, a rendering unit 730, and a tile Z value update unit 740. The above units may be embodied as software, hardware, and a combination of the software and the hardware, and connected with each other.

The tile segmentation unit 710 segments a scene for performing a rendering with respect to a triangle into a plurality of tiles. Each of the tiles is a screen resolution which is divided into a predetermined size, and the screen resolution is displayed to a user. The rendering with respect to each of the tiles is performed, and thereby may perform the rendering with respect to an entire scene. As an example, when a scene with a resolution of 640*480 is segmented into a plurality of tiles with a resolution of 32*32, a number of tiles for rendering correspond to 20*15. As described above, when the entire scene is segmented into the plurality of tiles, the rendering with respect to the entire scene may be performed by performing the rendering with respect to each of the tiles with a low resolution.

The tile selection unit 720 selects a tile which has a tile Z value less than a minimum Z value of the triangle from the plurality of tiles. The minimum Z value is a smallest Z value among Z values of three vertices of the triangle. The three vertices of the triangle exist in a 3D space comprising an x-axis, y-axis, and z-axis. In this instance, the z-axis is identical to an axis of user's line of sight, and a Z value on the z-axis designates a distance from the user's viewpoint. Accordingly, a point having a great Z value is relatively far from the user's sight, and a point having a small Z value is relatively near to the user's sight. Specifically, the point having the small Z value, from points having an identical x coordinate and y coordinate, may be displayed to the user, and remaining points are covered and unseen.

The triangle is on a plane, and each edge of the triangle is a straight line. Accordingly, a vertex having a Z value less than the smallest Z value, from the three vertices, may not exist on the triangle. Also, the smallest Z value of all points included in the triangle is the smallest Z value among Z values of the three vertices. Thus, the minimum Z value of the triangle is the smallest Z value of the three vertices.

Also, the tile Z value which is compared in tile selection unit 720 is a smallest value among maximum Z values of a triangle which completely include the tiles. The maximum Z value is a greatest value among the Z values of three vertices of the triangle. In this instance, a same principle as the minimum Z value is applied to the maximum Z value. When a tile is completely included in the triangle, the tile is completely covered with the triangle. Also, when the maximum Z value of the triangle has a value A, points having a Z value greater than the value A, in the tile, may not be displayed on the screen. Since the points having the Z value greater than the value A do not exist in the triangle, the points having the Z value greater than the value A, in the tile, are covered with the triangle, and are not displayed.

The rendering unit 730 performs the rendering with respect to the triangle in remaining tiles excluding the selected tile of the plurality of tiles is performed. The selected tile is covered with the other triangle, and the triangle is not displayed. Accordingly, the selected tile is excluded when performing the rendering, and thus the rendering may be performed more efficiently. The tile where the triangle is not displayed may exist among an unselected tile. Accordingly, although the Z test is required to be performed in a final process of the rendering, as in the conventional art, a rendering operation may be remarkably reduced compared to the conventional art, since a portion which may be completely overlapped is removed.

The tile Z value update unit 740 selects the tile which is completely included in the triangle from the plurality of tiles, and updates the tile Z value with the maximum Z value of the triangle, when the maximum Z value of the triangle is less than the tile Z value of the selected tile. In order to update the tile Z value, the tile is required to be completely included in the triangle. The tile which is not completely included in the triangle has a portion which is not covered with the triangle. Accordingly, another triangle may not be covered with the triangle. Thus, in order to update the tile Z value, the tile which is completely included in the triangle is required to be selected.

When selecting the tile which is completely included in the triangle, the tile Z value of the selected tile is compared with the maximum Z value of the triangle. In this instance, when the maximum Z value of the triangle is less than the tile Z value of the selected tile, the tile Z value of the selected tile is updated with the maximum Z value of the triangle. The tile Z value refers to when the triangle completely including the tile covers all points having a Z value greater than the tile Z value. Accordingly, when a triangle completely including the tile and having the maximum Z value less than an existing tile Z value exists, all the points having the Z value greater than the maximum Z value of the triangle are covered with the triangle. Thus, the tile Z value is required to be updated.

The above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, a method and system for an early Z test may eliminate performing of a rendering with respect to a triangle which is not displayed on a screen. Also, according to the present invention, a method and system for an early Z test may be performed with a simple operation by using information which is additionally generated in a tile binning process of a 3D rendering.

Also, according to the present invention, a method and system for an early Z test may be performed with a relatively small Z-buffer by performing the Z test per tile, as opposed to per pixel.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An early Z test method, the method comprising:
segmenting a scene into a plurality of tiles for performing a rendering with respect to a triangle;
selecting a first tile of the plurality of tiles, which has a tile Z value less than a minimum Z value of the triangle;
performing the rendering with respect to the triangle in remaining tiles excluding the selected first tile of the plurality of tiles, using a frame memory; and
outputting a result of the rendering on a display device
wherein the minimum Z value is a smallest Z value among Z values of three vertices of the triangle, and a maximum Z value is determined to be a determined greatest value of the Z values of the three vertices of the triangle,
wherein the selecting the first tile comprises determining maximum Z values of any triangles which completely include the first tile, determining a smallest value of the determined maximum Z values, and determining the tile Z value to be equal to the determined smallest value, and
wherein when at least two vertices of the triangle have different Z values, the maximum Z value is determined to be the determined greatest value of the Z values of the three vertices of the triangle.

2. The method of claim 1, further comprising:
selecting a second tile which is completely included in the triangle from the plurality of tiles; and
updating the tile Z value with the maximum Z value of the triangle, if the maximum Z value of the triangle is less than the tile Z value of the selected second tile.

3. The method of claim 2, wherein the selecting of the second tile which is completely included in the triangle comprises:
identifying a discrimination value of a tile node of each of the plurality of tiles; and
basing the selecting the second tile which is completely included in the triangle on the discrimination value.

4. The method of claim 3, wherein:
the discrimination value of the tile node comprises a first discrimination value, a second discrimination value, and a third discrimination value, and
the selecting the second tile which is completely included in the triangle based on the discrimination value further comprises determining the first discrimination value, the second discrimination value, and the third discrimination value based on a sign of a half-plane edge function value with respect to each of a first edge, a second edge, and a third edge of the triangle in the tile node of each of the plurality of tiles.

5. The method of claim 4, wherein the selecting the second tile which is completely included in the triangle based on the discrimination value further comprises selecting a tile which has a positive number for the first discrimination value, the second discrimination value, and the third discrimination value, with respect to all the tile node included in the tile of the plurality of tiles, as the tile which is completely included in the triangle.

6. A non-transitory computer-readable recording medium storing a program for implementing an early Z test method, the method comprising:

segmenting a scene into a plurality of tiles for performing a rendering with respect to a triangle;

selecting a tile from the plurality of tiles which has a tile Z value less than a minimum Z value of the triangle; and performing the rendering with respect to the triangle in remaining tiles excluding the selected tile of the plurality of tiles, wherein the minimum Z value is a smallest Z value among Z values of three vertices of the triangle, and a maximum Z value is determined to be a determined greatest value of the Z values of the three vertices of the triangle, wherein the selecting the first tile comprises determining maximum Z values of any triangles which completely include the first tile, determining a smallest value of the determined maximum Z values, and determining the tile Z value to be equal to the determined smallest value and wherein when at least two vertices of the triangle have different Z values, the maximum Z value is determined to be the determined greatest value of the Z values of the three vertices of the triangle.

7. An early Z test system, the system comprising:

a tile segmentation unit which segments a scene into a plurality of tiles for performing a rendering with respect to a triangle;

a tile selection unit which selects a tile from the plurality of tiles which has a tile Z value less than a minimum Z value of the triangle;

a rendering unit which performs the rendering with respect to the triangle in remaining tiles excluding the selected tile of the plurality of tiles; and an outputting unit which outputs a result of the rendering on a display device, wherein the minimum Z value is a smallest Z value among Z values of three vertices of the triangle, and a maximum Z value is determined to be a determined greatest value of the Z values of the three vertices of the triangle, and wherein the tile selection unit determines maximum Z values of any triangles which completely include the first tile, determines a smallest value of the determined maximum Z values, and determines the tile Z value to be equal to the determined smallest value and wherein when at least two vertices of the triangle have different Z values, the maximum Z value is determined to be the determined greatest value of the Z values of the three vertices of the triangle.

8. The system of claim 7, further comprising:

a tile Z value update unit which selects a tile which is completely included in the triangle from the plurality of tiles and updates the tile Z value with the maximum Z value of the triangle, if the maximum Z value of the triangle is less than the tile Z value of the selected tile.

9. The system of claim 7, wherein the tile segmentation unit, the tile selection unit, and the rendering unit are included in a personal terminal.

10. The system of claim 9, wherein the rendering unit performs the rendering using a frame memory embedded in a chip.

11. The system of claim 10, wherein the rendering unit transfers a rendered tile from the frame memory to an external frame buffer using a burst mode.

* * * * *